United States Patent
Schrader et al.

(10) Patent No.: US 11,286,446 B2
(45) Date of Patent: Mar. 29, 2022

(54) STILLAGE SOLIDS CONCENTRATION

(71) Applicant: BL Technologies, Inc., Minnetonka, MN (US)

(72) Inventors: John Andrew Schrader, Eureka, MO (US); Bryan Williams, Hallsville, MO (US); Michael R. Wood, Philadelphia, PA (US); Jeniffer Brown, Trevose, PA (US); Umit Turunc, Trevose, PA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 832 days.

(21) Appl. No.: 16/065,930

(22) PCT Filed: Feb. 13, 2017

(86) PCT No.: PCT/US2017/017619
§ 371 (c)(1),
(2) Date: Jun. 25, 2018

(87) PCT Pub. No.: WO2017/142827
PCT Pub. Date: Aug. 24, 2017

(65) Prior Publication Data
US 2020/0080035 A1 Mar. 12, 2020

Related U.S. Application Data

(60) Provisional application No. 62/296,641, filed on Feb. 18, 2016.

(51) Int. Cl.
*C12F 3/10* (2006.01)
*B01D 21/01* (2006.01)
*C08F 220/56* (2006.01)
*C08F 222/22* (2006.01)

(52) U.S. Cl.
CPC .......... *C12F 3/10* (2013.01); *B01D 21/01* (2013.01); *C08F 220/56* (2013.01); *C08F 222/22* (2013.01)

(58) Field of Classification Search
CPC ...................................................... C12F 3/10
See application file for complete search history.

(56) References Cited

U.S. PATENT DOCUMENTS

| | | | |
|---|---|---|---|
| 4,744,904 A | 5/1988 | McAninch et al. | |
| 5,916,991 A | 6/1999 | Chen et al. | |
| 6,228,400 B1 | 5/2001 | Lee et al. | |
| 6,488,946 B1 | 12/2002 | Milius et al. | |
| 7,497,955 B2 | 3/2009 | Scheimann et al. | |
| 7,566,469 B2 | 7/2009 | Scheimann | |
| 8,192,627 B2 | 6/2012 | Gallop et al. | |
| 8,283,484 B2 | 10/2012 | Cantrell et al. | |
| 8,557,125 B2 | 10/2013 | Suresh et al. | |
| 9,714,398 B2 | 7/2017 | Turunc | |
| 9,752,097 B2 | 9/2017 | Turunc et al. | |
| 2006/0006116 A1 | 1/2006 | Scheimann et al. | |
| 2006/0057264 A1* | 3/2006 | Hughes | C02F 1/56 426/495 |
| 2012/0125859 A1 | 5/2012 | Collins et al. | |
| 2012/0245370 A1 | 9/2012 | Sheppard et al. | |
| 2014/0319066 A1 | 10/2014 | LoCascio et al. | |
| 2016/0115425 A1 | 4/2016 | Blankenburg et al. | |
| 2016/0369170 A1* | 12/2016 | Balsamo De Hernandez | C10C 3/08 |

FOREIGN PATENT DOCUMENTS

| | | |
|---|---|---|
| CA | 2 789 917 A1 | 3/2013 |
| CN | 102965942 A | 3/2013 |
| WO | WO 2004/015121 A1 | 2/2004 |
| WO | WO 2005075362 A1 | 8/2005 |
| WO | WO 2013/135643 A1 | 9/2013 |
| WO | WO 2015/057191 A1 | 4/2015 |

OTHER PUBLICATIONS

Balzer, D. and Luders, H., "Nonionic Surfactants Alkyl Polyglucosides", pp. 2-14, 2000.
Wang, H. et al., "Effect of Low-Shear Extrusion on Corn Fermentation and Oil Partition", Food Science and Human Nutrition Publications and Papers, Iowa State University, Journal of Agriculture and Food Chemistry, 57, 2302-2307, 2009.
The Dow Chemical Company, Triton BG and CG Alkyl Polyglucoside Surfactants, Product Safety Assessment, Dow, pp. 1-6, 2010.
Cosmetic Ingredient Review, Final Safety Assessment, "Decyl Glucoside and Other Alkyl Glucosides as Used in Cosmetics", 31 pages, Dec. 19, 2011.
Database WPI, Week 201401, Apr. 1, 2014, Thomson Scientific, London, GB, AN 2013-K00861, XP002722596 & CN 102 965 942 A (Wuijang Hongqiangwei Textile Co., Ltd.) Mar. 13, 2013, Abstract.
Savic, S., et al., "Behind the Alkyl Polyglucoside-Based Structures: Lamellar Liquid Crystalline and Lamellar Gel Phases in Different Emulsion Systems Alkyl Polyglucosides, From Natural-Origin Surfactants to Prospective Delivery Systems" Chapter 2, pp. 21-52, 2014.
Eckard, A.D et al., "Enzyme Recycling in a Simultaneous and Separate Saccharification and Fermentation of Corn Stover: A Comparison Between the Effect of Polymeric Micelles of Surfactants and Polypeptides", Bioresource Technology, 132, pp. 202-209, 2013.

(Continued)

*Primary Examiner* — Peter Keyworth
(74) *Attorney, Agent, or Firm* — Armstrong Teasdale LLP

(57) ABSTRACT

Stillage solids concentration methods are disclosed wherein a solids concentration aid is added to a process stream mixture in a corn to ethanol process. The solids concentration aid may comprise a cationic polymer coagulant or flocculant or both, a starch based coagulant or flocculant or a biologically derived (i.e., plant or animal origin) coagulant or flocculant. Acrylamide/quaternary ammonium copolymers and homopolymeric polydiallyldimethyl ammonium chloride polymers are noteworthy examples of suitable solids concentration aids.

3 Claims, No Drawings

(56) References Cited

OTHER PUBLICATIONS

International Search Report and Written Opinion dated Apr. 8, 2014 for PCT/US2013/064956 filed Oct. 15, 2013.
International Preliminary Report on Patentability dated Apr. 19, 2016 for PCT/US2013/064956 filed Oct. 15, 2013.
International Search Report and Written Opinion dated Sep. 7, 2017 for PCT/US2017/017619 filed Feb. 13, 2017.
U.S. Office Action issued in U.S. Appl. No. 15/139,451 dated Dec. 27, 2016.
U.S. Office Action dated Nov. 9, 2016 in U.S. Appl. No. 15/029,813, filed Apr. 15, 2016.

* cited by examiner

STILLAGE SOLIDS CONCENTRATION

CROSS-REFERENCE TO RELATED APPLICATIONS

This application claims priority to PCT Appl. Serial No. PCT/US2017/017619, filed Feb. 13, 2017, and to U.S. Provisional Patent Application Ser. No. 62/296,641 filed Feb. 18, 2016.

FIELD OF INVENTION

Use of coagulants and/or flocculants either alone or in combination to concentrate and separate solids from the stillage streams in the corn ethanol process. The concentration and separation operations can be done at process temperatures.

BACKGROUND OF THE INVENTION

Over the past few decades, ethanol has become increasingly important as an alternative fuel. One advantage to use of ethanol fuel is that it can be produced from corn in a milling process. The residue of the corn to ethanol process is referred to as stillage. Stillage contains a mixture of solids, oil, and water.

In a corn milling operation, the corn kernels are ground, and the whole ground corn, without further separation of its constituents, is mixed with water, heated and processed to convert the starches into fermentable sugars; the resulting mixture is called mash. The mash is fermented to produce ethanol. Ethanol is separated from the fermented mash, called beer, by distillation in a stripper or distillation column. The residue of the distillation process, after the ethanol is removed, is called stillage or whole stillage. The whole stillage is then subjected to centrifuging or other separation methods to produce thin stillage and wet cake. The thin stillage is further processed in an evaporator or the like to remove excess water and produce "syrup" or evaporated thin stillage. Typically, this syrup has a moisture content of between about 55-75 wt %. Increasingly, part or all of the syrup stream is processed by mechanical and/or thermal and/or other separation techniques to separate corn oil for industrial use, such as manufacture of biodiesel.

The wet cake, either by itself or combined with stillage and/or syrup and/or other by-product streams of the corn ethanol process, is dried to make either distillers dried grains (DDG) or distillers dried grains with solubles (DDGS) which is sold as animal feed.

Currently saleable by-products of the corn ethanol process are DDG, DDGS and corn oil; this necessitates concentration of the solid fraction and removal of the water from stillage streams by mechanical and thermal methods, which use large amounts of energy. Therefore, it would result in significant energy savings to concentrate and facilitate the separation of the stillage solids by chemical addition; this method of concentrating and separating stillage solids may also lead to production of other commercially valuable products from the corn ethanol process.

SUMMARY OF THE INVENTION

In certain aspects of the invention, a method for concentrating solids in a corn to ethanol process is disclosed wherein oil and solids are present in a process stream mixture. The method may comprise, for example, adding to the process stream mixture an effective amount of a solids concentration aid wherein the solids concentration aid is a polymeric treatment devoid of (meth)acrylic acid/2-acrylamido-2-methyl-1-propane sulfonic acid or salts thereof.

In other embodiments of the invention, the solids concentration aid may be selected from the group consisting of a) a cationic polymer coagulant or flocculant, b) a starch coagulant or flocculant, or c) a biologically derived (plant and animal origin) coagulant or flocculant. In some aspects of the invention, the solids concentration aid is present in an amount of about 1-10,000 ppm based upon the weight of the process stream mixture. In some embodiments, the solids concentration aid is a cationic polymer represented by the monomeric repeat units.

[A]q [B]r and [C]s wherein q is present in a range of 1-99 parts, r is present in a range of 1-99 parts and s can be present in an amount of 0-99 parts with the proviso that q, r, and s=100 molar percent. The molecular weight of said cationic polymer being about 10,000-20,000,000 Dalton units, the combination of [A], [B], with or without [C] and with or without other monomers, being linear, branched, in block form, or in random form wherein [A] is chosen from acrylamide, methacrylamides, acrylic acid, methacrylic acid, and methyl methacrylic acid; [B] and [C] are cationic monomeric repeat units selected from the group consisting of: dimethylaminoethyl acrylate methyl chloride, dimethylaminoethyl (meth)acrylate methyl chloride quaternary salt, dimethylaminoethyl (meth)acrylate methyl sulfate quaternary salt, dimethylaminoethyl (meth)acrylate benzyl chloride quaternary salt, dimethylaminoethyl (meth)acrylate sulfuric acid salt, dimethylaminoethyl (meth)acrylate hydrochloric acid salt dialkylaminoalkylacrylamides or methacrylamides and their quaternary or acid salts, acrylamidopropyltrimethylammonium chloride, dimethylaminopropyl (meth)acrylamide methyl sulfate quaternary salt, and dimethylaminopropyl (meth)acrylamide hydrochloric acid salt, diethylaminoethylacrylate, diethylaminoethylmethacrylate, diallyldiethylammonium chloride, and diallyldimethyl ammonium chloride.

In some embodiments, the cationic polymer solids concentration aid is selected from:
  i) copolymers having monomeric repeat units of Formulae I and II

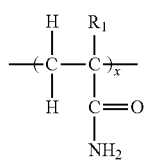

Formula I

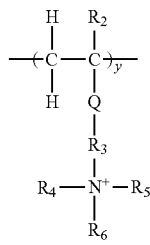

Formula II wherein x:y is within the rage of 95:5 to 5:95; $R^1$ and $R^2$ may be the same or different and are chosen form H, and $CH_3$; Q is —C(O)O—, —OC(O)—, or —C(O)NH—, $R_3$ is branched or linear ($C_1$-$C_4$) alkylene, $R_4$, $R_5$, and $R_6$ are each independently chosen from H, $C_1$-$C_4$ linear or branched alkyl, or a $C_5$-$C_8$ aromatic or alkylaromatic group, A is an anion selected from $Cl^-$, $Br^-$, $HSO_4^-$ or $MeOSO_3^-$ wherein Me is methyl;
  ii) copolymers of secondary amines and epichlorohydrin;
  iii) polymers formed from reaction of a lower dialkylamine, epichlorohydrin, and a member selected from ammonia, primary amines; alkylenediamines of from 2-6 carbon atoms and polyamines;
  iv) copolymers of adipic acid, diethylamine, and epichlorohydrin;
  v) copolymers of ethylenediamine and oxirane;
  vi) copolymers of acrylamide, dimethylamine, and formaldehyde;
  vii) copolymers of acrylamide and diallyl dialkyl ammonium chloride;
  viii) homopolymers of diallyl dialkyl ammonium chloride;
  ix) copolymers of tannin and a cationic monomer;
  x) and copolymers of chitin derivatives and/or chitosan with one or more cationic monomers.

Exemplary cationic polymer solids separation aids may comprise copolymers of acrylamide and a second monomeric repeat unit chosen from AETAC, MATAC, METAC, and AEDBAC. One particularly noteworthy cationic copolymer is a terpolymer of acrylamide/AETAC/AEDBAC.

In other exemplary embodiments, the solids concentration aid may comprise a coagulant such as homopolymeric polydiallyldimethyl ammonium chloride—(poly DADMAC).

In some embodiments, both a coagulant and flocculant are used conjointly as the solids concentration aid.

DETAILED DESCRIPTION

In one aspect of the invention, coagulant and flocculant types of chemicals can be used alone or in combination to concentrate stillage solids. The chemicals can be added to the stillage stream at any point in the post-distillation phase of the corn ethanol process. The concentrated solids can be separated from the stillage stream by any one of numerous commercially available solid-liquid separation methods. Some examples of solid-liquid separation methods include centrifugation, decantation, cyclonic separation, induced air flotation, dissolved air flotation, settling, thickening, clarifying and filtration. These methods can be used alone or in combination to facilitate the removal of the chemically concentrated solids.

In certain embodiments, the coagulants can be either electrolytes (inorganic salts) such as alum, lime, ferric sulfate, ferric chloride, or polyelectrolytes, which can be either biologically derived (plant or animal) materials, such as starches and gums, or synthetic organic chemicals.

In certain embodiments, the flocculants are polymeric and can be polyelectrolytes. Flocculants can be biologically derived (plant or animal) materials, such as starches, cellulose derivatives and gums; or synthetic organic chemicals.

Polymers or polyelectrolytes in the molecular weight range 10,000 to 1,000,000 are generally classified as coagulants, and in the molecular weight range 1,000,000 to 20,000,000 are generally classified as flocculants. Depending on the specific chemistry, manufacturing process and end use there may be some overlap in the molecular weight range of either classification.

In some embodiments, one or more coagulants may be added to the process stream in the aggregate dosage range of 1 part per million (ppm) to 10,000 ppm by weight relative to the process stream. If more than one coagulant is being used the dosage may be apportioned among the different coagulant types, not to exceed the maximum dosage. Preferably, the aggregate coagulant dosage range is 5 ppm to 5,000 ppm, and more preferably 10 ppm to 2,000 ppm.

In some applications, one or more flocculants may be added to the process stream in the aggregate dosage range of 1 part per million (ppm) to 10,000 ppm by weight relative to the process stream. If more than one flocculant is being used, the dosage may be apportioned among the different flocculant types, not to exceed the maximum dosage. Preferably, the aggregate flocculant dosage range is 5 ppm to 5,000 ppm, and more preferably 10 ppm to 2,000 ppm.

In practice, coagulants may be added first followed by flocculants; the method can also be practiced by adding flocculants first followed by coagulants. They can also be added concurrently.

Irrespective of the order of addition or the number of chemicals used, it is possible to practice staged or multistep addition, where the overall dosage of either the coagulant and/or the flocculant is divided into two or more portions and added to the stillage stream in several sequential or alternating steps at one or more points in the process.

After the addition of the chemicals to the process stream, in some embodiments, the concentrated solids may be separated from the stream by any one of numerous commercially available solid-liquid separation methods; some examples of solid/liquid separation methods include centrifugation, decantation, cyclonic separation, induced air flotation, dissolved air flotation, settling, thickening, clarifying and filtration. These methods can be used alone or in combination to facilitate the separation of chemically concentrated solids. The chemicals can be used in conjunction with an additional solid-liquid separation step utilizing a solid-liquid separation method that can include those mentioned above. Alternatively, the chemicals can be used in conjunction with existing solid-liquid separation steps and make those steps more efficient.

In certain embodiments, the method of concentrating stillage solids by use of chemicals can be practiced at the normal process temperatures of the corn ethanol manufacturing, generally in the 30° C. to 120° C. range.

In certain exemplary embodiments, the method of concentrating stillage solids by use of chemicals can be practiced at pH range of 2.5 to 10.0, preferably at pH range of 3.0 to 8.0. If necessary, the pH can be adjusted to accomplish the most effective concentration of solids, by use of a suitable alkalizing agent such as sodium hydroxide or lime; or acidifying agent such as sulfuric, sulfurous or hydrochloric acids.

Exemplary coagulants and flocculants for concentrating stillage solids are cationic in nature. Some examples of flocculants and coagulants are given below.

Synthetic Polymer Chemistries

In the present description, the term homopolymer means a polymer with only one type of monomer. A copolymer means a polymer with two or more different monomeric repeat units. A multi-component copolymer is being used to describe a copolymer with three or more different monomeric repeat units.

In some embodiments, the polymers of the present invention can be copolymers, including multi-component copolymers, of acrylamide or functionalized acrylamides or acrylic acid or functionalized acrylic acids, or acrylates or functionalized acrylates, with other monomers. For example, acrylamides and/or acrylates and/or acrylic acid can be polymerized with other monomers to impart cationic charge to the overall polymer molecule. Copolymers, including multi-component copolymers, of acrylamide, acrylate, and/or acrylic acid can include monomers [A], [B], and [C], in molar amounts of q, r, s, respectively. In other words, q, r, s, represent the relative moles of the monomers relative to each other. q can be 1 to 99 parts, r can be 1 to 99 parts, and s can be zero to 99 parts. It is possible to also have other monomers or to limit the monomers to [A] and [B] by themselves or [A], [B], and [C] by themselves. The molecular weight of the resulting copolymers, including multi-component copolymers, is in the 10,000 to 20,000,000 range. The combination of [A], [B], with or without [C] and with or without other monomers, can be linear, branched, in block form, or in random form.

[A] can be chosen from acrylamide, methacrylamides, acrylic acid, methacrylic acid, methyl methacrylic acid.

[B] and [C] can be cationic monomers selected from the group consisting of: dimethylaminoethyl acrylate methyl chloride, dimethylaminoethyl (meth)acrylate methyl chloride quaternary salt, dimethylaminoethyl (meth)acrylate methyl sulfate quaternary salt, dimethylaminoethyl (meth) acrylate benzyl chloride quaternary salt, dimethylaminoethyl (meth)acrylate sulfuric acid salt, dimethylaminoethyl (meth)acrylate hydrochloric acid salt, dialkylaminoalkylacrylamides or methacrylamides and their quaternary or acid salts, acrylamidopropyltrimethylammonium chloride, dimethylaminopropyl (meth)acrylamide methyl sulfate quaternary salt, and dimethylaminopropyl (meth)acrylamide hydrochloric acid salt, diethylaminoethylacrylate, diethylaminoethylmethacrylate, diallyldiethylammonium chloride, and diallyldimethyl ammonium chloride.

In certain aspects of the invention, these polymers can include monomers which are cationic acrylamides and monomers which are quaternary ammonium salt monomers, or both, with or without other monomers as well. The polymer can be linear, branched, or crosslinked and can be a block copolymer or a random copolymer. More specifically, some of the monomeric repeat units can be represented by the following formulas:

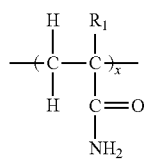

Formula I

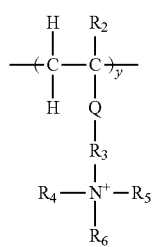

Formula II

The amount of the monomer represented by Formula I (herein designated as x) and the amount of monomer represented by Formula II (herein designated as y) can have a ratio of x:y that varies from 95:5 to 5:95, including 50:50 to 70:30 with the molar ratio (x):(y) 60:40 being presently preferred. $R^1$ and $R^2$ may be the same or different and are chosen from H and $CH_3$. Q is —C(O)O—, —OC(O)—, or —C(O)NH—, $R^3$ is branched or linear ($C_1$-$C_4$) alkylene; $R^4$, $R^5$, and $R^6$ are independently chosen from H, $C_1$-$C_4$ linear or branched alkyl, or an $C_5$-$C_8$ aromatic or alkylaromatic group; A is an anion selected from $Cl^-$, $Br^-$, $HSO_4^-$, or $MeOSO_3^-$ wherein Me is methyl.

Exemplary monomers which fall under Formula II can include:

1. (AETAC)—2-acryloxyethyltrimethyl ammonium chloride; also referred to as dimethylaminoethylacrylate methyl chloride; in terms of Formula II above $R_2$=H; Q is —C(O)O—, $R_3$=Et; $R_4$, $R_5$, and $R_6$ are all Me, and A is Cl—.
2. (MATAC)—3-(meth) acrylamidopropyltrimethyl ammonium chloride; in terms of Formula II above $R_2$=$CH_3$; Q is —C(O)NH—; $R_3$=Pr; $R_4$, $R_5$, and $R_6$ are all Me, and A is Cl—; Pr is propyl.
3. (METAC)—2-methacryloxyethyltrimethyl ammonium chloride; in terms of Formula II above $R_2$=$CH_3$; Q is —C(O)O—; $R_3$ is Et and $R_4$, $R_5$, and $R_6$ are all Me, and A is $C_1^-$; Et is ethyl.
4. (AEDBAC)—2-acryloxyethyldimethylbenzyl ammonium chloride; in terms of Formula II, $R_2$=H, Q is —C(O)O—; $R_3$ is Et, $R_4$ and $R_5$ are Me, $R_6$ is benzyl, and A is $Cl^-$.

Other exemplary chemistries for the polymers include the ones below (with or without other monomers):

a) Copolymers of secondary amines, such as dimethylamine and epichlorohydrin;
b) Polymers formed via reaction of i) a lower dialkyl amine ($C_1$-$C_3$); an epoxy reactant such as epichlorohydrin, and iii) a member selected from ammonia, primary amines, alkylenediamines of from 2-6 C atoms and polyamines;
c) Copolymers of adipic acid, diethyltriamine and epichlorohydrin,
d) Copolymers of ethylenediamine and oxirane:
e) Copolymers of acrylamide, dimethylamine and formaldehyde:
f) Copolymers of acrylamide and diallyl dimethyl ammonium chloride and homopolymers of diallyldialkyl ($C_1$-$C_3$) ammonium chloride such as polydiallyl dimethyl ammonium chloride (polyDADMAC);
g) Copolymers of tannin and cationic monomer. Information on this can be obtained from U.S. Pat. No. 5,916,991, the disclosure of which is incorporated herein;
h) Copolymers of chitin derivatives and/or chitosan with one or more cationic monomers to impart an overall cationic charge to the copolymer molecule; an example of which is given in U.S. Pat. No. 8,557,125. The disclosure of this patent is incorporated by reference herein.

The present invention can also include additional starch based chemistries as coagulants and/or flocculants, as identified below, where the starch can be starch from corn, potato, rice, wheat and/or other plants.

| Common Name | Codex number | CAS No. |
|---|---|---|
| Acid treated starch | INS 1401 | 65996-63-6 |
| Alkaline treated starch | INS 1402 | |
| Bleached starch | INS 1403 | 977075-42-5 |
| Oxidized starch | INS 1404 | 65996-62-5 |
| Monostarch phosphate | INS 1410 | 11120-02-8 |
| Distarch phosphate | INS 1412 | 55963-33-2 |
| Phosphated distarch phosphate | INS 1413 | 977043-58-5 |
| Acetylated distarch phosphate | INS 1414 | 68130-14-3 |
| Starch acetate | INS 1420 | 9045-28-7 & 57456-08-3 |
| Acetylated distarch adipate | INS 1422 | 63798-35-6 & 68130-14-3 |
| Hydroxypropyl starch | INS 1440 | 9049-76-7 |
| Hydroxypropyl distarch phosphate | INS 1442 | 53124-00-8 |
| Starch, hydrogen octenylbutanedioate | INS 1450 | 52906-93-1 & 66829-29-6 |

| Common Name | Codex number | CAS No. |
| --- | --- | --- |
| Acetylated oxidized starch | INS 1451 | 68187-08-6 |
| Starch from corn, potato, rice, wheat or other plants | | 9005-25-8 |
| Cationic starch: starch (2-hydroxypropyl) trimethylammonium chloride ether | | 56780-58-6 |
| Cationic starch: Copolymer of starch and 3-chloro-2-hydroxypropyl trimethylammonium chloride (CTA) | | |
| Cationic starch: Copolymer of starch and quaternary ammonium chloride monomer | | |

Additional chemistries that can be used as coagulants and/or flocculants include the following biologically derived (plant & animal origin) flocculant and coagulant chemistries:
   a) Agar
   b) Alginates
   c) Carrageenan
   d) Gum Arabic
   e) Gum tragacanth
   f) Gum karaya
   g) Gellan gum
   h) Gelatin
   i) Konjac gum
   j) Pectins
   k) Xanthan gum
   l) Cellulose derivatives:
      a. Methyl cellulose
      b. Hydroxypropyl cellulose
      c. Hydroxyethyl cellulose
      d. Carboxymethyl cellulose
      e. Hydroxypropylmethyl cellulose
   m) Galactomannans:
      a. Locust bean gum
      b. Guar gum
      c. Tara gum In one exemplary embodiment of the invention, the coagulant is homopolymeric polydiallyldimethyl-ammonium chloride, and the flocculant is an acrylamide based copolymer comprising repeat units of acrylamide/(2-(acryloyloxy)ethyl trimethyl ammonium chloride [AETAC]/acryloxyethyl dimethyl benzyl ammonium chloride [AEDBAC].

The coagulants and flocculants used in accordance with the invention are applied to a process stream that is present in a corn to oil process. By process stream mixture, we mean that the coagulant and/or flocculant is brought into contact with any oil/solids/water mixture present in such corn to oil processes or into contact with any solids or liquids that will ultimately be brought into contact with such oil/solids/water mixture. The phrase "process stream mixture" includes whole stillage process streams, thin stillage process streams, evaporator streams, syrup streams, liquid/solid separators such as centrifuges, and the feed or make up to a corn to ethanol fermentation process such as fermentation feed addition to a beer well or the like.

One combined coagulant/flocculant solids separation aid is:

Coagulant: Poly (diallyl dimethyl ammonium chloride); at dosage range of 200-400 ppm.

Flocculant: Cationic terpolymer of acrylamide, AETAC (2-(Acryloyloxy) ethyl trimethylammonium chloride) and AEDBAC (Acryloxyethyl dimethylbenzyl ammonium chloride); at a dosage range of 200-500.

The temperature of the stillage stream was 150° F. (65.6° C.), and pH was adjusted from 3.0 to 6.4 with sodium hydroxide.

It will be apparent to those skilled in the art that many modifications can be made in the methods and compositions herein disclosed without departing from the spirit of the invention. It is to be understood that the scope of the invention is to be limited solely by the scope of the appended claims.

What is claimed is:

1. A method for concentrating solids in a corn to ethanol process wherein oil and solids are present in a process stream mixture, said method comprising adding to said process stream mixture a solids concentration aid, said solids concentration aid comprising:
   a) a coagulant comprising a polydiallyldialkylammonium chloride polymer and
   b) a flocculant comprising a terpolymer of acrylamide/2-(acryloyloxy) ethyl trimethylammonium chloride/acryloxyethyl dimethylbenzyl ammonium chloride.

2. The method as recited in claim 1, wherein
   a) is present in an amount of about 200-400 ppm based upon the total weight of process stream mixture and b) is present in an amount of about 200-500 ppm based upon the total weight of said process stream mixture.

3. The method as recited in claim 2, wherein a) is polydiallyldimethyl ammonium chloride.

* * * * *